March 11, 1958 D. E. HULL 2,826,699
FLUID FLOW MEASUREMENT
Filed Oct. 29, 1954

INVENTOR
DONALD E. HULL
BY
ATTORNEYS

United States Patent Office 2,826,699
Patented Mar. 11, 1958

2,826,699

FLUID FLOW MEASUREMENT

Donald E. Hull, Berkeley, Calif., assignor to California Research Corporation, San Francisco, Calif., a corporation of Delaware Application October 29, 1954, Serial No. 465,602

13 Claims. (Cl. 250—43.5)

This invention relates to methods and apparatus for measuring the rate of fluid flow in pipe lines or other fluid-conducting passages by the introduction of a known quantity of radioactive material, and particularly refers to the steps of determining the total number of gamma or other suitable radioactive rays registered by a detector associated with the pipe or passage through which the known quantity of radioactive material has been passed, and comparing that number with a response characteristic of the system to determine the values of flow rate in terms of quantity per unit time.

This invention is based upon the discovery that, under the flow conditions just outlined, the integral or total number of gamma or other suitable radioactive rays detected is inversely proportional to the velocity of flow, but is independent of the way in which the radioactivity is spread out along the fluid stream due to flow conditions therein.

Heretofore, it has been considered necessary to consider the volume of fluid in a known length of pipe or passage, as, for example, in the procedure described in U. S. Patent 2,631,242. In that procedure, a small quantity of a soluble or miscible radioactive material, e. g., an isotope which will emit a substantial quantity of alpha, beta, or preferably gamma radiation, is injected into the pipe and a determination is made of the time required for its subsequent passage between two spaced points which define a known volume. This usually requires a considerable length of uniform pipe, free from branch connections, flow restrictions, or the like. Suitably responsive detectors are mounted at selected spaced points and are connected through pre-amplifiers to a single counting rate meter and a chart recorder. The two successive peaks caused by passage of the injected body or slug of radioactive tracer are thus recorded on a convenient time scale. The known volume of the pipe section between the detecting points is divided by the observed time interval to determine the flow rate.

This invention, however, requires only the steps of injecting a known small quantity of a radioactive fluid into the flowing stream to be measured, and monitoring the stream to obtain a time-integral value of the effect of the radioactivity during passage or transit of the resultant radioactive segment past a given point. This may be done by means of a single detector unit, for example, a Geiger tube, which is placed in the stream or adjacent the pipe wall at any convenient downstream location. The total radioactivity A, of the injected fluid is known, for example, one millicurie, and the total counts, N, detected from the radioactive material passing the single detecting point are measured by a suitable counting and totalizing meter. If the flow rate in absolute units is required, for example, gallons per minute, a calibration may be made on a short length of an equivalent conduit or confined fluid passage containing a known concentration of radioactive material with an equivalent detector arrangement to obtain a response characteristic or proportionality factor, F, which may be expressed, for example, as counts per minute from one millicurie of radioactive material per gallon of fluid. The flow rate to be determined is then found by the equation:

$$V = \frac{FA}{N}$$

where:
$V$ = flow rate, gallons per minute
$A$ = quantity of radioactivity added in millicuries
$N$ = net counts during passage of quantity A which may be done by computation, or the use of an appropriate chart or nomograph or by automatic electrical equipment. In the determination of the total counts N, the background count due to natural radioactivity, cosmic rays, etc., is subtracted from the indicated value, as is conventional in such measurements in this art.

If only relative flow rates are needed, the specific value of the response characteristic or proportionality factor F may not be required, as it is quite feasible to standardize upon the quantity of radioactive material to be injected under different or varying rates of flow, the latter being determinable upon the basis of $$V \sim \frac{A}{N}$$

wherein the terms V, A, and N are the same as given above, in appropriate units.

Also, if one flow rate is known under such conditions, the others may readily be determinable as absolute values, i. e., in quantities per unit time.

The following discussion outlines in more detail the mathematical basis for this improved measuring procedure, which has been amply proved by field utilization, as will be set forth in examples below.

This method is based upon the principle of integrating the response of a detector of radioactivity, for example, a Geiger counter, while a definite quantity of a radioactive isotope tracer having known properties flows through the pipe or passage with which the detector is associated. The number of counts so recorded, after subtracting the background, is independent of the way in which the concentration of tracer varies along the pipe, but is inversely proportional to the velocity at which the tracer flows past the detection point. The number of counts, for example, registered by the detecting and indicating equipment does depend upon the pipe dimensions and the placement of the detector units with respect to the fluid stream and the passage through which it moves. A proportionality factor or response characteristic for a given size, material, and type of pipe may be determined by filling short section of the same or equivalent pipe with a fluid containing a known concentration of the specific radioactive isotope and noting the counting rate of the detector, also placed in a comparable position to that of the field use. The factor F, which represents counts per unit time registered from a unit of radioactivity per unit volume, as, for example, counts per minute from one microcurie per gallon, may be used in the above-mentioned equation to calculate absolute values of flow rates, as is shown by the following discussion.

Let N be the integral number of counts and R be the instantaneous counting rate, both corrected for background. Then, over the duration of the passage of the tracer:

$$N = \int R \, dt \quad (1)$$

Now R is proportional to the continually varying concentration, C, of the tracer. The proportionality constant is the factor, F, determined by calibration for a given pipe and detector geometry.

$$R = FC \quad (2)$$

Substituting, $$N = F \int C \, dt \quad (3)$$

Let V be the flow rate in gallons per minute. Then $dq$, the increment of volume passing during the interval $dt$, is $$dq = V dt \quad (4)$$

Again substituting:

$$N = \frac{F}{V} \int C \, dq \quad (5)$$

But the integral of radioisotope concentration over the total volume is simply the total quantity, A, of radiotracer, expressed in appropriate units, e. g., millicuries.

$$\int C \, dq = A \quad (6)$$

Hence, $$N = \frac{FA}{V} \quad (7)$$

Solving for flow rate, $$V = \frac{FA}{N} \quad (8)$$

Assuming that F has been determined for a given isotope in a given pipe, the experimental measurement of the quantity of isotope injected, A, and of the number of counts recorded, N, gives the necessary data for calculating V.

It is an object of this invention to provide an improved method and means for determining the relative or absolute values of flow rates of fluids, either gases or liquids, in confined passages without disturbing either the fluid being transmitted or the conduit or passage through which it flows.

Another object is to provide an improved method and means for flow rate determination that may be applied to existing installations without substantial alterations thereto.

Another object is to provide an improved method and means for flow rate determination that is essentially simple to install and to operate, which may be made portable and thereby usable for intermittent or infrequent applications, and which uses available radioisotopes which are in such low concentrations and small quantities that they are safe to handle without unusual or expensive health precautions, shields, etc.

Another object is to provide a method and means for utilizing radiotracer technique in fluid flow determination that may be made in remote or hazardous locations that preclude human attendance or physical manipulation by operators.

Another object is to provide a method and means for fluid flow determination that may be made substantially automatic in operation.

These and other objects and advantages will be further apparent from the following description and the attached drawing, which forms part of this specification, and illustrates several embodiments of means suitable for practicing this invention.

Figure 1:
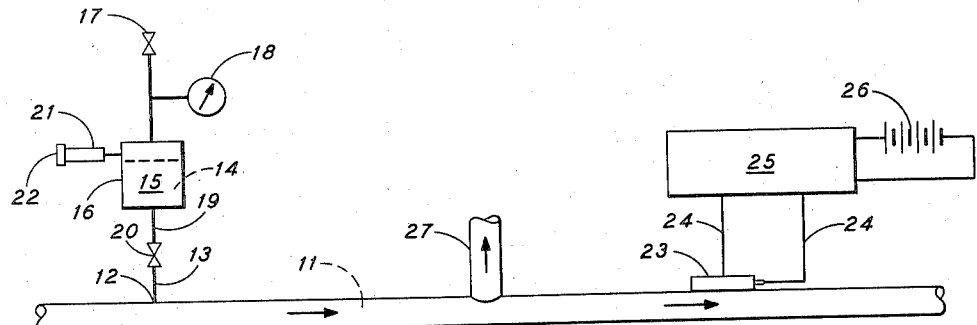
Figure 1 is a diagrammatic elevational view of a simple form of apparatus for measuring either the relative or absolute value of fluid flow as applied to a pipe or conduit system.
Figure 2:
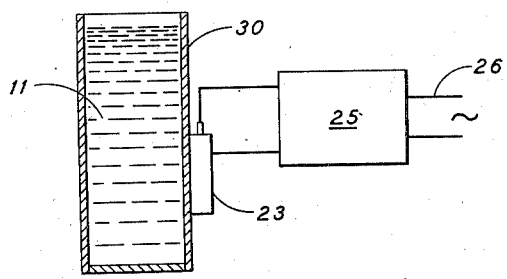
Figure 2 is a vertical and part sectional view of a simple form of apparatus for determining the proportionality factor or response characteristic of a specific installation of detector, conduit and counting meter.

Referring to the drawing, and particularly to Figures 1 and 2, reference numeral 10 designates a pipe or conduit through which a fluid 11 is passing at a flow rate which is to be determined. At a convenient point 12 a small branch connection or pipe 13 is provided to permit the introduction of a predetermined quantity of radioisotope 14 contained in an injector generally designated 15. A convenient arrangement of the injector may be a closed metal vessel 16 having a valved inlet 17 to which is attached a pressure gage 18. The outlet 19 of vessel 16 communicates through valve 20 to the branch connection 13 leading to pipe 10. If a liquid isotope solution is used, means for pressurizing vessel 16 are provided, such as a small side chamber 21, communicating with the upper part of vessel 16 and adapted to receive a metal bulb filled with carbon dioxide or other inert gas under pressure higher than that in line 10. Means are provided responsive to application of the closure cap 22 or other parts of chamber 21 to perforate the closure of the bulb and release the gas contents into vessel 16, which will be indicated by an increased reading of pressure gage 18. Bulb-discharging devices of the nature discussed are commercially available for a variety of uses such as inflating life belts, charging carbonated water bottles, etc. An example of such a device is shown in U. S. Patent No. 2,066,517. Gage 18 is also useful to indicate, by a suddenly lowered reading, when all the liquid 14 has been expelled from injector 15.

At a convenient point downstream from point 12 along pipe 10, at a distance which will assure adequate mixing of the isotope 14 with fluid 11, one or more radiation detectors 23 such as Geiger tubes, scintillation counters or other suitable radioactive detector devices are temporarily or permanently placed adjacent to the pipe. The type and position of the detector installation is determined by the nature of the radiation to be detected, for example, if alpha or beta particles are to be observed, a suitably transparent window must be used, or the detector unit is optionally placed in a well or tube extending into pipe 10. Generally, a gamma-emitting isotope is preferred, such as cesium[134], salts of which are soluble in water and would be usable if the fluid 10 were aqueous. That isotope emits two gamma rays (0.60 and 0.79 m. e. v.) and has a 2.3 year half-life, which makes it convenient to handle and store. Also, its ready solubility in water makes contamination problems negligible. Even if accidentally swallowed, its chemical similarity to sodium causes its elimination from the body in a matter of days.

If the fluid 11 is non-aqueous, for example, oil, a suitable isotope would be an oil solution of radioactive antimony, e. g., triphenyl stibine containing antimony[124] which emits gamma rays with an energy of 1.7 m. e. v. and has a half life of 60 days. Cobalt naphthenate containing cobalt[60] is another oil-soluble compound which emits gamma rays of 1.17 and 1.33 m. e. v. and has a half life of 5.2 years. For gas streams, suitable radioactive isotopes are available, e. g., xenon[135] or krypton[85] which can be charged under suitable pressure with an inert carrier gas such as nitrogen into injector 15.

The response from detector 23 is suitably transmitted through wires 24 to a conventional electrical impulse counter 25 arranged as a totalizer, so that it records the total of the counts detected from the radioactive material added to the fluid stream 11. Counter 25 is energized from a suitable power source 26. If only relative fluid flow ratios are desired, the same quantity of radioisotope 14, for example, one millicurie, may be charged repeatedly into line 10, and, by comparing the integrated or total counts of the successive radioactive stream-segments thus formed, the relative flow rate may be determined from the inverse ratio mentioned above.

Desirably, however, the response characteristic or proportionality constant, F, defined above, and expressed in appropriate units, for example, counts per minute from one microcurie per gallon, is determined for the types, materials, and sizes of conduits, pipes or passages wherein the flow of a certain aqueous or non-aqueous liquid or gas is to be measured with a specific arrangement of detecting equipment. As the factor F depends upon materials and thicknesses of such conduits, a series of determinations may be made for calibration and the results used thereafter in field tests or routine operations of fluid flow measurements.

Referring to Figure 2 of the drawing, reference numeral 30 designates a short length of a pipe or conduit of the same material, diameter and thickness as pipe 10, closed at one end and substantially filled with the same fluid, in this case water, which passes through the pipe 10 wherein the flow rate is to be measured. One or more detectors 23 are arranged adjacent to pipe section 30 in the same manner as in the actual field flow measuring procedure. Counting meter 25, which need not be arranged as an integrator but only a rate-indicator, is suitably connected to the detectors. The water 11 with which pipe section 30 is filled contains a known concentration of the radioactive isotope which is to be used in the measuring procedure. The response characteristic or proportionality factor of the Figure 2 arrangement may thus be determined, taking into consideration the normal background count, to obtain the factor, F, discussed above.

A typical example of such a group of determinations for conduits carrying sea water involved sections 30 of pipe, each about two feet long, closed at one end and filled with a solution containing 42.3 microcuries (0.0423 millicurie) of cesium$^{134}$ in a 1% solution of sodium chloride in water. A single 12-inch Geiger tube was secured to the outside of the pipe section 30 midway between the ends, and the count rate was measured to 0.5% standard deviation. The following results were obtained.

*Table I*

| Pipe Diameter (Inch) Inside | Material | Wall Thickness (Inch) | Type of Lining | Lining Thickness (Inch) | Count Rate (Counts per sec.) | Proportionality Factor, F (Counts/sec. per mc./gal.) |
|---|---|---|---|---|---|---|
| 8 | Steel | 0.322 | Portland Cement. | 0.50 | 222.1 | 315 |
| 6 | ---do--- | 0.344 | ---do--- | 0.31 | 186.5 | 264 |
| 6 | ---do--- | 0.438 | None | | 186.3 | 264 |
| 4 | ---do--- | 0.237 | Portland Cement. | 0.25 | 144.1 | 205 |
| 3 | ---do--- | 0.216 | ---do--- | 0.25 | 81.6 | 116 |
| 2 | ---do--- | 0.219 | None | | 75.1 | 107 |
| 1½ | ---do--- | 0.187 | ---do--- | | 55.1 | 78 |
| 1½ | Brass | 0.156 | ---do--- | | 70.2 | 100 |

It can be shown that, even if a portion of the fluid 11 flowing in pipe section 10 is diverted, as through branch 27, the response of detector 23 will still be an accurate indication of the rate of flow at point 12. Under such circumstances, the total quantity of radioactivity introduced into fluid 11 at 12 remains constant. That portion flowing past detector 23 is now moving at a slower rate due to the diverted stream through branch 27. The longer time required for the radioactive material to flow past the detector exactly counteracts the effect of reduced amount of radioactivity at that point as will be apparent from the foregoing discussion, so that the totalized or integrated counts of the unit 25 will be exactly the same as if no fluid had been diverted from the pipe 10.

Hence, if access can be had to any downstream point in a branching system for placement of a detector, the flow rate at the tracer injection point can be determined.

Figure 3:
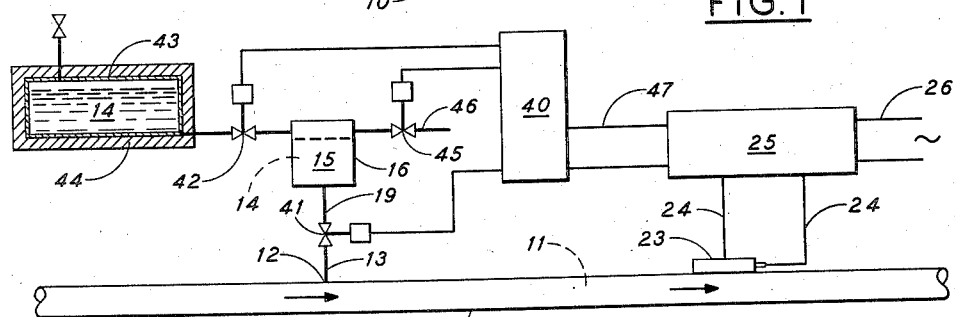
Figure 3 is a diagrammatic elevational view of a simple form of equipment for practicing the method wherein automatic repetitive measurements are obtained to give a substantially continuous determination of flow rate.

Referring now to the arrangement of Figure 3, which illustrates an installation in which periodic introductions are made of a known quantity of radioactive material to give an automatic indication of flow rate in pipe 10, reference numeral 40 designates a timer suitably connected to control valves 41 and 42 which periodically admit the desired metered quantity of radioactive material from injector 15 into pipe line 10. During the time interval between such additions, injector 15 is refilled or recharged from the radioactive isotope storage tank 43, which is desirably enclosed in shield 44. Injector 15 is repressured by valve 45 which admits nitrogen or carbon dioxide gas or other pressurizing fluid to vessel 16 through line 46 from a suitable source (not shown).

The same type of detector unit 23 and counting totalizer 25 may be used as in the arrangement of Figure 1, and timer 40 is connected to the totalizer by a circuit 47 to initiate and terminate its operation to keep it compatible or in step with the introduction of the radioactive material. For example, at the start of a given cycle of operation, timer 40 first actuates valve 41 to admit the metered quantity of radioactivity to pipe line 10. Either at once or a suitable time thereafter, depending upon the rate of flow of fluid 11 in pipe 10, the totalizing counter 25 is reset to zero and started in operation by timer 40 through circuit 47. The timer 40 then acts to close valve 41 and open valve 42 to admit an additional quantity of isotope from storage tank 43 to metering vessel 16. Valve 42 is then closed and repressuring valve 45 is opened by timer 40 for a period of time adequate to bring vessel 16 to the proper pressure for the succeeding isotope injection.

Meanwhile, the segment of the stream carrying the previously introduced quantity of radioactive material 14 has passed through line 10 to be registered by counter 25 which totalizes the response of detector 23. Desirably, but not necessarily, the counter 25 is equipped with a background-subtracting arrangement of a type available in this art, and has a suitable scale calibrated in appropriate units of flow rate, such as gallons per minute, based upon the mathematical relations already discussed. Thus, during the cycle just described, the arrangement will give the desired indication of rate of flow in pipe or passage 10 at point 12. At a desired subsequent time, depending upon how accurately the flow rate is to be determined and the probability of variations in flow rate that may occur in pipe 10, the cycle may be repeated.

Figure 4:
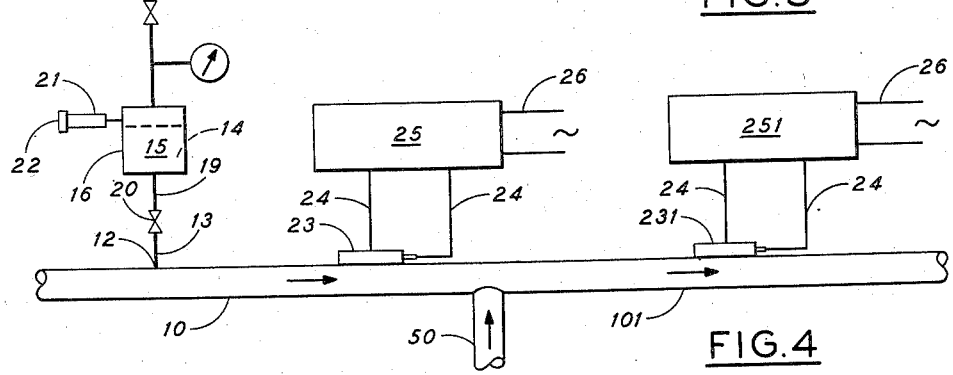
Figure 4 is a diagrammatic elevational view of an arrangement for determining the fluid flow conditions in a system fed from more than one fluid source.

A further application of the broad features of this method is shown in Figure 4 of the drawing, which illustrates a branched conduit system in which a first flow of fluid in line 10 is supplemented by a second flow entering from branch 50. In this case, it is desired to learn the flow rate through line 10 both above and below the branch 50. The flow rate of the fluid entering the system through branch 50 may then be obtained by simple subtraction.

One arrangement for doing this involves two detectors 23 and 231 and their corresponding count totalizing or integrating units 25 and 251, with a single radioactive fluid injector 15 similar to that already described. The total count response of detector 23 and counter 25 indicates the flow rate in conduit 10 at point 12. The entry of fluid from branch 50 dilutes the radioactive isotope concentration in the right-hand section of conduit 10, herein designated 101, but the total amount of radioactivity remains the same. The flow rate in 101, however, is greater than in 10, so that this same quantity of radioactivity will pass detector 231 in a shorter time and will result in a lower total count from detector 231 that is registered by totalizer 251. By the inverse proportion relation outlined above, the respective rates of flow in 10 and 101 may be determined by comparison of the respective total counts.

Desirably, the diameters and materials of conduits 10 and 101 should be the same, so that a single proportionality factor, F, could be used for both. However, this is not essential, as it is quite feasible to determine separate factors F for each section, if the conduit system so requires.

The apparatus disclosed herein is claimed in my copending application, Serial No. 581,099, filed April 27, 1956, which is a continuation-in-part of this case.

Although specific embodiments of means and procedures for carrying out this method have been illustrated and described herein, it is apparent that other arrangements and steps may be employed, and all such changes and modifications that come within the scope of the appended claims are intended to be embraced thereby.

I claim:

1. The method of determining relative rates of flow of a fluid stream under different conditions, comprising the steps of introducing a first known quantity of radioactive material into said stream under a first flow condition, detecting the effect of said added radiation at a downstream point, integrating said effect, introducing a second known quantity of radioactive material into said stream under a second flow condition, detecting the effect of said second added radiation at said downstream point, integrating said last-named effect and determining the relative fluid flow rates solely from the inverse relation of said first and said second integrated effects and said known quantities of radioactive material.

2. The method of claim 1 in which one of said flow rates is separately determined in values of unit volume per unit time, whereby the other one of said flow rates is determined as an absolute value.

3. The method of determining the rate of fluid flow in a confined passage, comprising the steps of determining the response characteristics F of a portion of an equivalent passage filled with said fluid to which has been added a known quantity of radioactive material, adding a specific quantity A of radioactivity to the fluid flowing in said passage; detecting the counts due to said added radioactivity at a single point downstream from said point of introduction, integrating said counts to obtain a quantity N and determining the rate of fluid flow V only according to the equation $$V = \frac{FA}{N}$$

where:
$V$ = quantity of fluid per unit time
$F$ = detector response, counts per unit time from a given quantity of radioactivity per quantity of fluid
$A$ = quantity of radioactivity added
$N$ = integrated detector response.

4. The method of determining the volumetric rate of fluid flow in a confined passage having at least one branch through which fluid leaves said passage, comprising the steps of determining the radioactive response characteristic of said fluid-containing passage beyond said branch and an associated radiation detector to a known amount of radioactivity, adding a specific quantity of radioactivity to said main stream at a point ahead of said branch, and determining the rate of fluid flow in said main stream by integrating the response of said detector to the transit of at least part of said added radioactivity through said branch.

5. The method of determining the rate of flow V in a passage conveying a fluid stream, comprising the steps of determining the radioactive response characteristic F of a single detector for radiation from a known concentration of radioactivity in said fluid, adding a known quantity A of radioactivity to the fluid flowing in said passage, exposing said single detector to at least a portion of said fluid stream to count radioactive disintegrations taking place therein during the transit of said radioactivity past said detector, integrating said counts to obtain a quantity N, and determining the rate of fluid flow V solely according to the equation $$V = \frac{FA}{N}$$

6. The method of determining relative volumetric rates of flow of a fluid stream under different conditions, consisting of the steps of introducing a first known quantity of radioactive material into said stream under a first flow condition, monitoring at least a portion of the stream to obtain a time-integral value of the effect of said first known quantity of radioactivity during its transit by a given downstream point, introducing a second known quantity of radioactive material into said stream under a second flow condition, monitoring at least a portion of the stream to obtain a time-integral value of the effect of said second known quantity of radioactivity during its transit by a given downstream point, and determining the relative flow rates solely from said known quantities of radioactive material and the inverse relation of said first and second time-integral values.

7. The method of claim 6, with the added step of determining the rate of flow of said stream under one of said conditions in values of volume rate per unit time, whereby the other one of said flow rates is determined as an absolute value.

8. The method of measuring the rate of fluid flow in a passage conveying a fluid stream, consisting of the steps of monitoring a fixed volume of said fluid containing a known concentration of radioactivity to determine a proportionality factor, dispersing a known quantity of radioactivity into the fluid flowing in said passage at a predetermined location therein, monitoring at least a portion of the fluid flowing in said passage containing said dispersed radioactivity to obtain a time-integral value of the effect of the added radioactivity in said portion during its entire transit by a given downstream point, and determining the flow rate of the fluid in said passage at the location of said radioactivity addition solely from values of said proportionality factor, said time-integral value, and the known quantity of radioactivity added to said stream.

9. In a method of determining the volumetric flow rate of a fluid passing a given upstream location, the steps which comprise introducing a known quantity of radioactivity into a fixed volume of said fluid, detecting and counting the total disintegrations from said radioactivity within a representative portion of said fixed volume thereby establishing the response characteristics of the detection device in the environment in which the detection is made, thereafter introducing a known quantity of radioactivity into said stream at said upstream location to form a radioactive segment of the fluid in said stream, said segment containing said known quantity of radioactivity dispersed therein, detecting and counting the total disintegrations from said radioactivity between the downstream and the upstream boundaries of at least a portion of said segment as it flows past a downstream detection point, and determining the ratio of volume of flow to said fixed volume solely from said rsponse characteristic, said known quantity of radioactivity and said total count.

10. The method of claim 9, wherein the fluid is a liquid.

11. The method of claim 9, wherein the fluid is a gas.

12. The method of claim 9, wherein the radioactivity is added in the form of a known amount of a radioactive isotope.

13. The method of measuring the flow rate in volumes per unit of time of a stream of fluid passing a given upstream location which comprises introducing a known quantity of radioactivity into said stream at said upstream location to form a radioactive segment of the fluid in said stream, said segment containing said known quantity of radioactivity dispersed therein, detecting and counting the total disintegrations from said radioactivity between the downstream and upstream boundaries of at least a portion of said segment as it flows past a detection point, and determining the volumes per unit of time of fluid passing said upstream location solely as a function of said total counts, the known quantity of added radioactivity, and the response characteristics of the detection device used in the environment in which the detection is made.

References Cited in the file of this patent

UNITED STATES PATENTS

| | | |
|---|---|---|
| 1,291,489 | Hadaway | Jan. 14, 1919 |
| 2,627,543 | Obermaier | Feb. 3, 1953 |
| 2,631,242 | Metcalf | Mar. 10, 1953 |
| 2,706,254 | Mithoff et al. | Apr. 12, 1955 |

OTHER REFERENCES

"Nucleonics," April 1955, pp. 18–19, pub. April 12, 1955.